Jan. 26, 1960     W. BAYRE     2,922,681
ANTIFRICTION BEARINGS
Filed Nov. 26, 1957
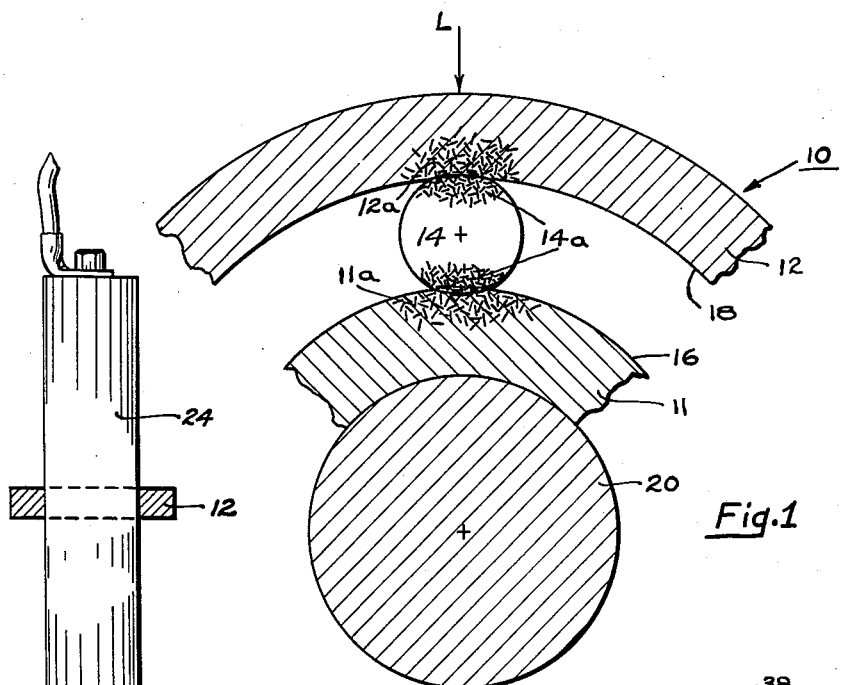
Fig.1
Fig.2
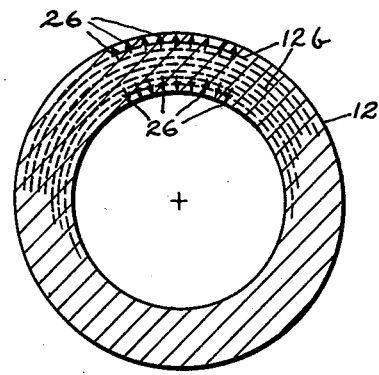
Fig.3
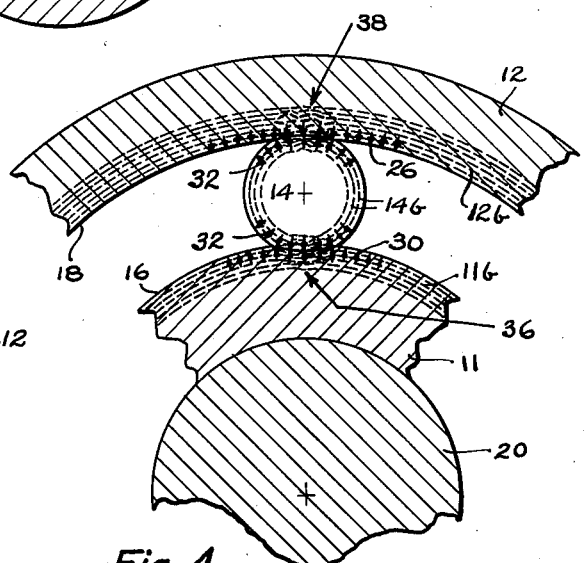
Fig.4
INVENTOR
Willard Bayre
BY Edward H. Goodrich
HIS ATTORNEY United States Patent Office
2,922,681
Patented Jan. 26, 1960

2,922,681

ANTIFRICTION BEARINGS

Willard Bayre, Orange, N.J., assignor to General Motors Corporation, Detroit, Mich., a corporation of Delaware Application November 26, 1957, Serial No. 699,021

14 Claims. (Cl. 308—207)

This invention relates to antifriction bearings and particularly to a method of treating the components of an antifriction bearing to increase the operating life of the bearing.

An antifriction bearing, such as a roller bearing or a ball bearing, employs a series of cooperating rolling elements which are free to circumferentially move in rolling engagement with opposed annular raceways on a pair of opposed race rings to provide for a relative antifrictional rotation of these race rings with respect to each other even when under load. Such a bearing when under no load has a very small area of contact between each rolling element and the raceway, this area usually comprising a line contact in the case of a roller and closely approximating a point contact in the case of a ball. In view of the very heavy stress concentrations between a rolling element and a raceway under load and to provide for suitable operating capacities in antifriction bearings, the material and hardness of the race rings and of the rolling elements are preferably controlled so that the small portion of a raceway engaged by a moving rolling element will momentarily and slightly deflect under the bearing load to provide a greater contact area between the rolling element and the raceway. This momentarily deflected portion immediately returns to its original contour when the load stress has been relieved. However, after these contacting bearing surfaces have repeatedly undergone an enormous number of such deflections under changing load, the material of the raceways adjacent to the raceway surfaces fractures and flakes off causing rapid and often sudden bearing failure due to fatigue of the material of the race rings. A similar condition may occur with respect to the rolling elements. The fatigue life of an antifriction bearing depends upon many factors some of which vary to the extent of often being unpredictable. In fact, in precision antifriction bearings manufactured from the best obtainable steel, fatigue is the major cause of bearing failure. The bearing industry has spent many years of study and experimentation in an effort to reliably increase the fatigue life of antifriction bearings.

It is, therefore, an object of my invention to provide an improved antifriction bearing and method of construction therefor wherein one or more of the bearing parts are prestressed in a manner to increase the fatigue life of the bearing.

It is a further object of my invention to provide an improved antifriction bearing having a rolling element engaging a raceway wherein controlled stress concentrations are produced within a raceway in the direction of rolling element movement to increase the fatigue life of the bearing.

It is an additional object of my invention to provide an improved antifriction bearing having a rolling element engaging a raceway under load and wherein predetermined stresses are set up within the raceway which yieldably oppose the deformations temporarily produced in the raceway under load engagement with the rolling element.

It is a further object of my invention to magnetically set up radial stress components within parts of an antifriction bearing which will combat fatigue failure of the bearing.

It is a still further object of my invention to produce within portions of a bearing magnetostrictive stresses which provide stresses that resiliently resist deflection of bearing surfaces under load to increase the fatigue life of the bearing.

To these ends and also to improve generally upon devices and methods of this character, the invention consists in the various matters hereinafter described and claimed. In its broader aspects, the invention is not necessarily limited to the specific structures or to the particular method selected for illustrative purposes in the accompanying drawing wherein:

Figure 1 is a fragmentary cross sectional view diagrammatically illustrating an antifriction bearing under radial load with the bearing components free from magnetic influence.

Figure 2 is a cross sectional view showing one method of magnetizing a bearing race ring.

Figure 3 is a cross sectional view digarammatically illustrating magnetostrictive forces within a race ring.

Figure 4 is a fragmentary view generally similar to Figure 1 and diagrammatically illustrating magnetic forces and stress components within bearing parts which combat fatigue failure in a bearing.

Heretofore, in the manufacture of antifriction bearings, much care has been exercised to avoid magnetizing of the various bearing parts. In fact, it is common practice to subject the hardened steel parts of an antifriction bearing to a demagnetizing operation just before bearing assembly to be sure that such a bearing is free from residual magnetism. It has been generally accepted that the presence of magnetically affected particles in the vicinity of an antifriction bearing may result in these particles becoming lodged between the rolling elements and raceways thereby producing severe damage to the bearing which usually causes sudden failure of the bearing. It has been found that a hardened steel ring of uniform contour and high quality may be magnetized in a circular direction without having any magnetic poles which would magnetically hold particles against the ring.

When an elongated metal bar of a magnetizable material as nickel or steel is longitudinally magnetized, the length of the bar changes. In accordance with a generally accepted magnetic theory pertaining to such materials, it is thought that the ferromagnetic materials contain an infinite number of minute areas or zones referred to as domains each of which has a magnetic characteristic, these domains being in non-aligned haphazard relation when the material is unmagnetized as a body. Ferromagnetic materials include steel, nickel, cobalt and alloys importantly affected by a magnetic field. These domains are generally considered to be long and narrow and may be magnetically affected along their crystalline axes causing them to reorient with respect to each other. When a strong external magnetic field is applied to such a bar and lengthwise of the bar, these domains usually increase in length and are oriented into alignment causing cooperative magnetization of the domains thereby setting up aligned stresses which increase the length of the bar.

In accordance with this theory of magnetism, when an unmagnetized ring of homogeneous ferromagnetic material, as the hardened race ring of an antifriction bearing, is magnetized under the influence of a very strong magnetic field passing around and through the ring, the magnetic domains are oriented from an initially haphazard jumbled relation to a circular relation coaxial of the ring. This realignment magnetizes the ring in a circumferential direction causing these aligned domains to produce within the ring a magnetostrictive force within and circumferentially of the ring. Since the ring comprises a continuously annular homogeneous material free from open ends, the magnetism within the ring will be circular and without poles. Also, since there are no open ends or poles from which magnetic flux may escape, this residual magnetism will be retained indefinitely in the ring. In contrast to the magnetostrictive stresses which influence an elongation in a generally rectilinear bar, the inherent strength of the continuously annular ring, as a bearing race ring, resists the circumferential magnetostrictive stresses causing these stresses to set up radial components of stress as indicated by the arrows in Figures 3 and 4. These radial components of stress at the surface of a raceway or a roller resist deflections of this surface under operating load in the bearing and also aid the momentarily deflected surface to return to its original shape thereby appreciably increasing the fatigue life of the bearing. Also, these circumferentially extending magnetostrictive forces at and adjacent to the peripheral load-carrying surface, cause this surface, as the raceway, to be under compression thereby adding to its load-carrying capacity and increasing its fatigue life.

Referring to the illustrations, an antifriction bearing 10 has inner and outer race rings 11 and 12 in relatively rotatable relation through a circumferential series of rolling elements 14 that are free to roll on the radially opposed inner and outer annular raceways 16 and 18. The inner race ring may be suitably mounted on a shaft 20 and a radial load on the bearing is indicated at L. For clarity of illustration, only one rolling element is shown but it is to be understood that a circumferential series of similar rolling elements engage both raceways to cooperatively support the load and provide for relative antifrictional raceway rotation. In accordance with usual practice, when the bearing operates under load there may be a momentary slight deformation of the engaging portions of the rolling elements and raceways under load to provide better stress distribution and to avoid too high stress concentration. Usually, the greater part of this momentary deformation occurs in the raceways, this being greatly exaggerated in the drawings for clarity. The inner race ring, outer race ring and each of the intervening rolling elements when in a demagnetized condition contain an enormous number of non-aligned magnetic domains in haphazard jumbled relation as diagrammatically shown at 11a, 12a and 14a. To greatly improve the fatigue life of this bearing, each of the race rings is subjected to a strong magnetic field which causes each ring to become a permanent magnet having a circular magnetic field concentric with the ring axis. This magnetism may be produced by locating one of the race rings, as 12, in surrounding coaxial relation about an elongated cylindrical conductor as a copper bar 24 and then passing a direct current of low voltage and high amperage axially in one direction through the bar 24 as illustrated in Figure 2. If preferred, a direct current of high amperage may be fed through an insulated conductor wound in the general form of a torus about the race ring. This magnetic flux circumferentially aligns the magnetic domains coaxially of the ring as diagrammatically illustrated in Figure 3. Since this ring is homogeneous and continuously annular, it will have no measurable magnetic poles even when saturated with circular magnetism. The circular alignment of these magnetic domains 12b sets up annular magnetostrictive forces diagrammatically illustrated by dashes. Due to the annular form of the magnetized ring, these magnetostrictive forces are under circumferential compression and consequently produce radial stress components indicated by the arrows 26. Also, these magnetostrictive forces strengthen the ring and particularly its raceway by exerting a circumferentially extending compressive force to the raceway. Additionally, the rolling elements 14 may be circumferentially and permanently magnetized without producing any magnetic poles thereby providing magnetostrictive forces under circumferential stress as diagrammatically illustrated by the circular dash lines 14b in Figure 4. These magnetostrictive stresses 14b resulting from reorientation of the magnetic domains 14a, produce radial stress components 32. One convenient method of circumferentially magnetizing rollers has been to clamp a roller endwise coaxially between a pair of elongated electrodes of the same cross sectional size as the roller and flowing a direct current of high amperage and low voltage between the electrodes and axially under uniform density through the roller.

As shown in Figure 4, the inner and outer race rings 11 and 12 and the rolling elements have each been strongly magnetized to circumferentially align the magnetic domains as indicated at 11b, 12b and 14b thereby providing in these members radial stress components indicated by the arrows 30, 32 and 26. These radial stress components in cooperation with the circumferentially directed stresses combat the momentary small deflections in the raceways and/or rolling elements to greatly increase the fatigue life of the bearing. Additionally, when such raceway and/or rolling element deflections occur, the alignment of magnetic domains is momentarily disturbed as indicated at 36 and 38. As the rolling element advances and the load is relieved, these surfaces immediately return to their previous circular contours. Due to the magnetostrictive effect of the aligned magnetic domains adjacent to the disturbed domains, these disturbed domains are magnetically urged back into circular alignment with the result that my arrangement provides fatigue-resisting radial stress components 30, 32 and 26 and circumferentially extending stresses which resiliently urge the operating surfaces back to their original circular contours. It is to be understood that the surface deformations referred to are very slight and have been greatly exaggerated in the drawings for clarity of illustration. These magnetostrictive forces which have been found to increase the fatigue life of a bearing are preferably provided in the finished bearing parts before assembly of the bearing but may also be applied to a bearing that has been in use by magnetizing the various parts as described. If desired, the magnetization in the race rings may be maintained even stronger by providing a suitable electromagnetic flux about the ring. Additionally, my invention also applies to a slide form of antifriction bearing wherein rolling elements are engaged under load by a pair of opposed parallel linear extending raceways. In such a slide bearing, it is preferred that the raceways be restricted from longitudinal expansion under the influence of magnetostrictive stresses.

I claim:

1. The method of increasing the life of a bearing comprising a pair of relatively movable bearing members having opposed bearing surfaces in load engagement, said method comprising the steps of inducing in one of said members a magnetostrictive stress longitudinally of the relative movement of said members and which produces a stress component that resists deformation of that portion of one of said surfaces engaged under load by said other member.

2. The method of increasing the life of a bearing comprising a pair of relatively movable bearing members respectively provided with bearing surfaces in load-carrying engagement with each other, said method comprising the steps of magnetically inducing in each of said members a magnetostrictive stress directed longitudinally of said relative movement while restricting each of said members from a measurable dimensional change longitudinally of said relative member movements.

3. The method of increasing the life of an antifriction bearing comprising a pair of spaced bearing members having opposed raceways in spaced relation to each other, and a circular member for rolling engagement under load against both raceways to allow relative antifrictional bearing member movements, the steps of inducing in one of said members a magnetostrictive stress longitudinally of the rolling movement of said circular member and which produces stress components that resist deformation of that portion of one of said surfaces engaged under load against the circular member.

4. The method of increasing the life of an antifriction bearing comprising a pair of spaced race members each of which has a raceway, and a rolling element for rolling engagement with the raceways under load to facilitate relative antifrictional race member movements, the step of producing a uniform compressive magnetostrictive stress in one of said race members while restricting said member from measurable dimensional change, said magnetostrictive stress producing a series of stress components in opposition to the rolling element surface at the zone of rolling element contact under load.

5. The method of increasing the life of an antifriction bearing comprising a pair of ferromagnetic spaced race members each of which has a raceway, and a rolling element for rolling engagement with both raceways under load to facilitate relative antifrictional race member movements, the step of aligning the magnetic domains of one of the race members to provide a magnetostrictive stress under compression in said race member while restricting the race member from measurable dimensional changes longitudinally of said stress, and said magnetostrictive stress providing a yieldable stress component generally normal thereto and which resists deformation of the raceway under rolling element load.

6. The method of increasing the life of an antifriction bearing comprising a pair of ferromagnetic spaced race members respectively having raceways, and a rolling element for rolling engagement along the raceways under load to allow relative antifrictional race member movements, the step of aligning the magnetic domains in one of the race members longitudinally of the rolling element movement and without producing any magnetic poles in said race member, and said magnetic domains being arranged to temporarily shift out of alignment adjacent the zone of rolling element contact under load and providing yieldable stress components within the race member which resist raceway distortion under load.

7. The method of making an antifriction bearing comprising a pair of ferromagnetic race rings, forming an annular raceway on each race ring, and a plurality of rolling elements for rolling engagement with said raceways to allow antifrictional rotation of one of the race rings with respect to the other, the step of inducing a magnetostrictive stress under compression and circumferentially within one of said race rings while restricting a measurable dimensional change of said race rings, and said magnetostrictive stress producing radial stress components which strengthen the load carrying capacity of a raceway to increase bearing life.

8. The method of making an antifriction bearing comprising a pair of ferromagnetic race rings, forming an annular raceway on each race ring, and a plurality of rolling elements for load carrying rolling engagement with both raceways, the step of magnetizing both race rings annularly thereof without producing magnetic poles therein, said magnetization causing each race ring to contain circumferentially extending magnetostrictive stresses under compression, and said magnetostrictive stresses producing in each ring radial stress components which aid the raceway support and which resist raceway deflections under load engagement with said rollers.

9. An antifriction bearing comprising a pair of spaced ferromagnetic race members, each race member having a raceway, a plurality of circular members in rotatable engagement with both raceways to provide for relative antifrictional race member movements under load, one of said race members being magnetized longitudinally of said roller movements between the raceways and providing a magnetostrictive stress in said race member longitudinally of and adjacent to its raceway, and said magnetostrictive stress providing generally normal to the raceway of the magnetized member component stresses which strengthen that portion of the raceway engaged under load by each circular member.

10. An antifriction bearing comprising a pair of spaced ferromagnetic race members, each race member having a raceway, a roller element for rolling engagement with said raceways under load to provide relative antifrictional race member movements, one of said race members being magnetized free of any magnetic pole and providing a compressed magnetostrictive stress in said member longitudinally of the roller movement between the raceways, and said magnetostrictive stress providing beneath the raceway of the magnetized member component stresses which add support to that portion of the raceway engaged under load by said roller.

11. An antifriction bearing comprising a pair of ferromagnetic race rings each of which has an annular raceway, a plurality of circumferentially arranged rolling elements between and engageable with the raceways under radial load for free rolling movements to provide relative race ring rotation, one of said race rings being magnetized in an annular direction adjacent to its raceway without having any magnetic pole, said magnetic effect producing an annular magnetostrictive stress under compression with radial stress components which improve the load carrying capacity of the raceway to increase bearing life.

12. An antifriction bearing comprising a pair of coaxial ferromagnetic race rings each of which has an annular raceway, a plurality of circumferentially arranged rollers rotatably engageable under radial load with the raceways to provide for free race ring rotation, one of said race rings being permanently magnetized in a circumferential direction and having no magnetic pole, said magnetic effect producing beneath the raceway a uniformly continuous magnetostrictive stress under circumferential compression, the magnetized race ring being of sufficient inherent strength to substantially prevent any dimensional change circumferentially of the race ring under influence of said stress, and said magnetostrictive stress producing radial stress components which yieldably aid in resisting raceway deformations under load against the rollers.

13. An antifriction bearing comprising a pair of ferromagnetic race rings each of which has an annular raceway, a circumferentially arranged series of rolling members between and engageable with the raceways under radial load for rolling movements to facilitate antifrictional rotation of one of the race rings with respect to the other ring, each of said race rings being magnetized in a circumferential direction of the ring and having no magnetic pole, said magnetic effects producing in each race ring a circumferentially extending magnetostrictive force under compression without affecting any measurable dimensional change in the race rings, and said magnetostrictive forces under compression producing radial component stresses which yieldably support the raceways and improve the load-carrying capacity of each raceway under roller engagement.

14. An antifriction bearing comprising a pair of ferromagnetic race rings each of which has an annular raceway, a circumferential series of ferromagnetic rollers between and in rollable engagement under radial load with both raceways to provide for antifrictional race ring rotation, each of said race rings and each of said rollers being circumferentially magnetized without having any magnetic pole, said magnetization providing in each ring and in each roller adjacent its annular surface a uniform magnetostrictive stress under longitudinally extending compression, the rollers and race rings having sufficient inherent strength to resist dimensional changes thereof under the magnetostrictive stresses, and said magnetostrictive stresses producing in the race rings and in the rollers radial stress components which are in opposing relation at points of load contact between the rollers and raceways to resist deformations of said surfaces under contact thereby increasing bearing life.

References Cited in the file of this patent

UNITED STATES PATENTS

| | | |
|---|---|---|
| 408,465 | Dewey | Aug. 6, 1889 |
| 1,730,424 | Harrison | Oct. 8, 1929 |
| 2,381,730 | Ellis | Aug. 7, 1945 |